April 30, 1935.  F. A. KNIGHT  1,999,814
VEGETABLE WASHER
Filed May 2, 1932

INVENTOR.
Floyd. A. Knight.
BY Philip A. Minnis
ATTORNEY.

Patented Apr. 30, 1935

1,999,814

UNITED STATES PATENT OFFICE 1,999,814

VEGETABLE WASHER

Floyd A. Knight, Cedar Rapids, Iowa, assignor to Food Machinery Corporation, San Jose, Calif., a corporation of Delaware Application May 2, 1932, Serial No. 608,685

2 Claims. (Cl. 146—219)

This invention relates to the art of washing vegetables and the like and especially green corn on the cob, and has particular reference to a new and improved method of washing the same as well as a novel form of apparatus adapted to practice the method.

As is well known, the silk-like fibres which form the corn tassel are not ordinarily considered to be edible and when the corn is to be canned these must first be removed, preferably prior to cutting the kernels from the cob. Inasmuch as many of the fibres are more or less deeply embedded between the rows of kernels, their mechanical removal presents something of a problem, and while apparatus has been designed for the purpose it is ordinarily cumbersome, complicated and expensive. Moreover, it is not adapted for the removal of decayed or worm eaten kernels, so that these must be trimmed from the cob by hand, thus requiring the employment of a considerable amount of hand labor.

It is an important object of this invention to provide a method of washing corn on the cob whereby the silk is effectually removed while at the same time decayed and worm eaten kernels are washed away without the necessity of hand trimming.

It is also an object to provide a method of washing corn on the cob or other vegetables whereby the same are passed over upwardly projected sprays having sufficient pressure to lift and support the vegetables, whereby they are agitated and turned about while so supported, thus effectually presenting all sides to the washing sprays.

Another object is to provide an apparatus for carrying out the method referred to which shall be of simple and rugged construction, and efficient and inexpensive in operation.

Figure 1:
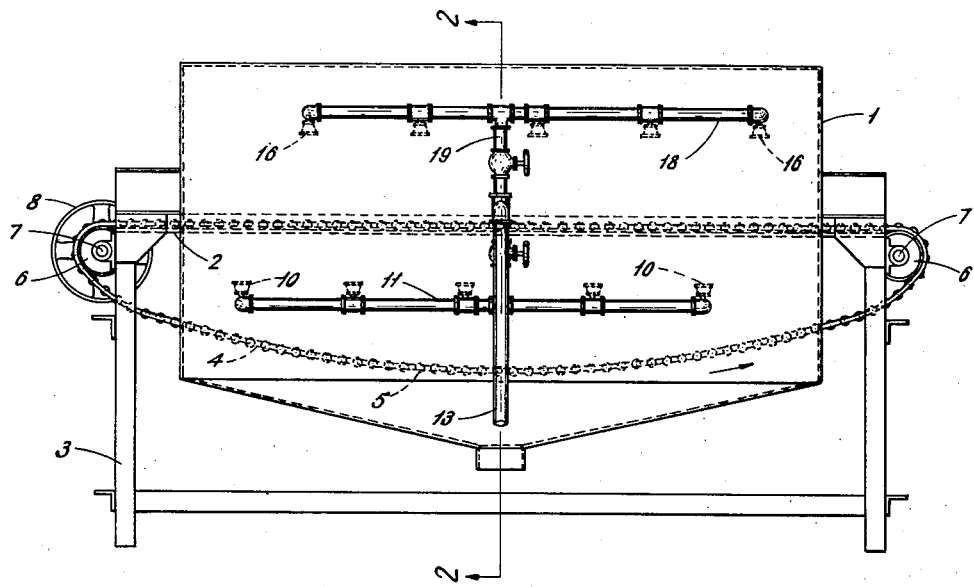
Figure 2:
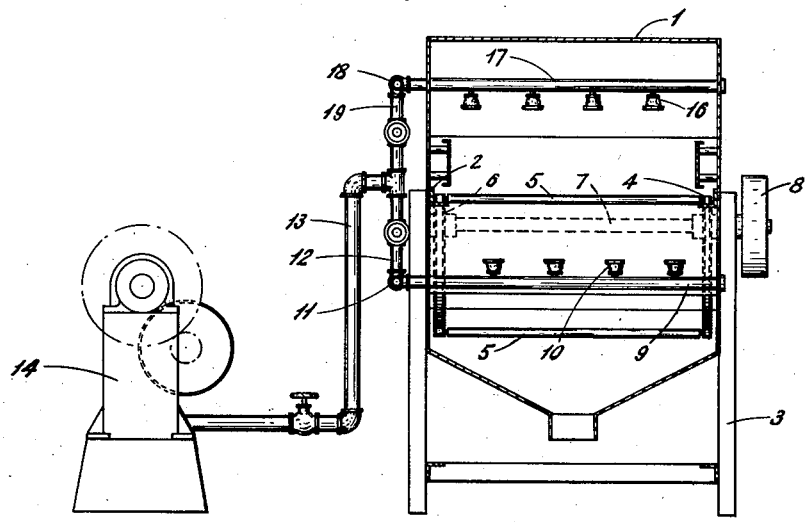

Further objects and advantages will become apparent as the description proceeds in connecton with the accompanying drawing, wherein Figure 1 is a side elevation of one form of apparatus embodying the principles of the invention, and Figure 2 is a sectional elevation taken along the line 2—2 of Figure 1.

The apparatus illustrated comprises an open ended housing 1 supported by suitable angle iron frame members 2 and the whole is supported by legs 3. The upper and working run of an endless conveyor, made up of the endless side chains 4 interconnected by a plurality of spaced roller cross rods 5, extends longitudinally through the housing and is supported by sprockets 6 at each end of the machine around which the chains are passed. The sprockets 6 are secured to shafts 7 journaled in suitable bearings, and power for operating the conveyor may be supplied to one of these shafts by means of a pulley 8. Sagging of the upper runs of the conveyor chains is prevented by the frame members 2 which are positioned beneath the chains as shown so as to provide for their support.

Arranged within the housing and below the upper run of the conveyor are a plurality of transverse pipes 9 provided with upwardly directed spray nozzles 10 designed to project high pressure jets of washing liquid against the ears of corn or other vegetables resting on the conveyor. The pipes 9 are interconnected by means of a longitudinal main 11 which is supplied with washing liquid through pipes 12 and 13 from a pump 14.

The pump 14 is designed to deliver washing liquid to the spray nozzles 10 under sufficient pressure so that the jets of washing liquid issuing from the nozzles impinge against the undersides of the ears of corn carried by the conveyor with such force as to lift them free of the conveyor momentarily as they pass over the jets. The pressure required for the accomplishment of this purpose is preferably calculated or determined by trial in each case since it is obviously dependent upon the size of the nozzles and their proximity to the conveyor.

As the ears are thus momentarily lifted free of the conveyor they have a tendency to rotate somewhat so that a larger surface of the corn in subjected to the action of the washing liquid than would be the case if low pressure sprays were used which would permit the ears to remain stationary relative to the conveyor. Moreover, by causing the ears to be thus rotated by each set of jets it is insured that the several jets will have an opportunity of acting against all sides of the corn. If desired the nozzles may be slightly canted in a forward direction to assist in the advancement of the ears.

The high pressure sprays have been found to be very effective in penetrating between the rows of kernels on the corn and removing the silk therefrom so that after it has passed over several sets of jets it emerges from the washer entirely free of silks. Worm eaten and decayed kernels are also effectually removed by the jets so that trimming is unnecessary and the corn is ready for the cutters.

A second series of spray nozzles 16 is arranged above the conveyor to assist in the washing, these nozzles being fed by transverse pipes 17 interconnected by the main 18 and receiving washing liquid from the pipe 13 by means of the pipe 19. The pipes 17 are staggered with respect to the lower pipes 9 so that the spray jets issuing from the nozzles 16 will not interfere with the action of the lower jets, and the nozzles 16 are also preferably staggered relative to the nozzles 10 so that no portions of the vegetables on the conveyor shall escape the action of the washing liquid.

It is believed that the construction and operation of the apparatus will be apparent from the foregoing description and it will be seen that the use of the high pressure sprays arranged in upper and lower transverse sets and in staggered relation results in a simplified apparatus of small size adapted to effectively remove silks and worm eaten kernels from ear corn while insuring that no portion of the corn escapes the action of the sprays.

It will be understood, of course, that while the apparatus herein disclosed is especially useful for treating ear corn, its usefulness is not altogether limited thereto, but it may also be used to advantage, if desired, for the washing of other vegetables, fruits or the like.

Having now described my invention and in what manner the same may be used, what I claim as new and desire to protect by Letters Patent is:

1. The method of cleaning and silking husked ear corn which comprises freely supporting the ears while passing them over a path for treatment, and directing a series of liquid jets upwardly against the ears at spaced intervals in their path of travel under sufficient pressure to penetrate the crevices between the rows of kernels and remove embedded silks therefrom and to lift and reposition the ears whereby different portions of their surfaces are presented to succeeding jets.

2. The method of cleaning and silking husked ear corn which comprises freely supporting the ears while passing them over a path for treatment, directing a series of liquid jets downwardly against the ears at spaced intervals in their path of travel under sufficient pressure to penetrate the crevices between the rows of kernels and remove embedded silks therefrom, and alternately directing a series of fluid jets upwardly against the ears under sufficient pressure to penetrate the crevices between the rows of kernels and remove embedded silks therefrom and to lift and reposition the ears whereby different portions of their surfaces are presented to succeeding jets.

FLOYD A. KNIGHT.